No. 789,389. PATENTED MAY 9, 1905.
E. SCHLEICHER.
MACHINE FOR THE MANUFACTURE OF HEADED PINS OR THE LIKE.
APPLICATION FILED OCT. 29, 1903.

6 SHEETS—SHEET 1.

No. 789,389. PATENTED MAY 9, 1905.
E. SCHLEICHER.
MACHINE FOR THE MANUFACTURE OF HEADED PINS OR THE LIKE.
APPLICATION FILED OCT. 29, 1903.
6 SHEETS—SHEET 3.
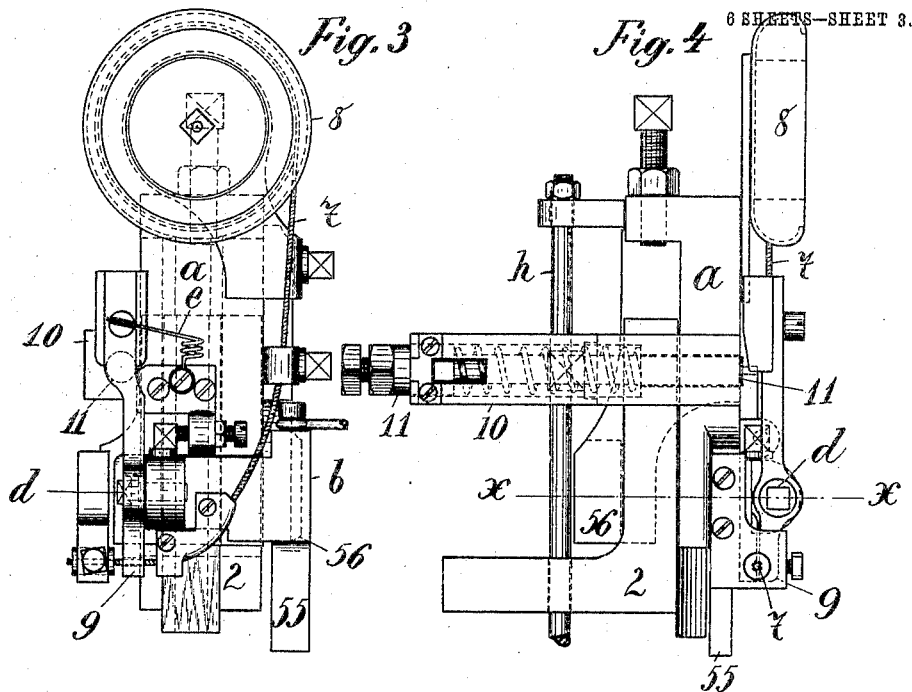
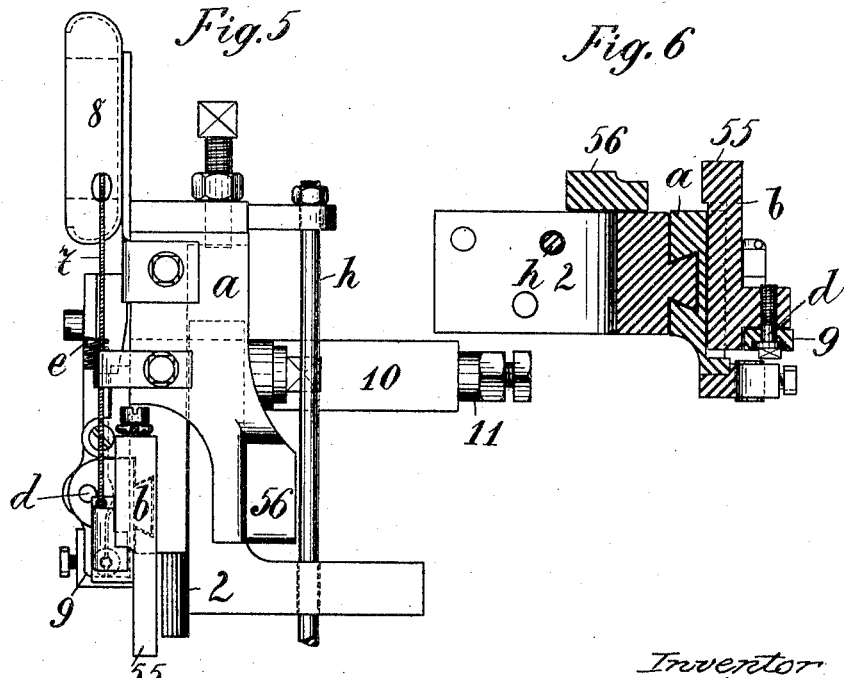
Witnesses
N. M. Kuehne
John A. Percival
Inventor
Emil Schleicher
By Richardson
Attorneys No. 789,389. PATENTED MAY 9, 1905.
E. SCHLEICHER.
MACHINE FOR THE MANUFACTURE OF HEADED PINS OR THE LIKE.
APPLICATION FILED OCT. 29, 1903.
6 SHEETS—SHEET 4.
Fig. 7
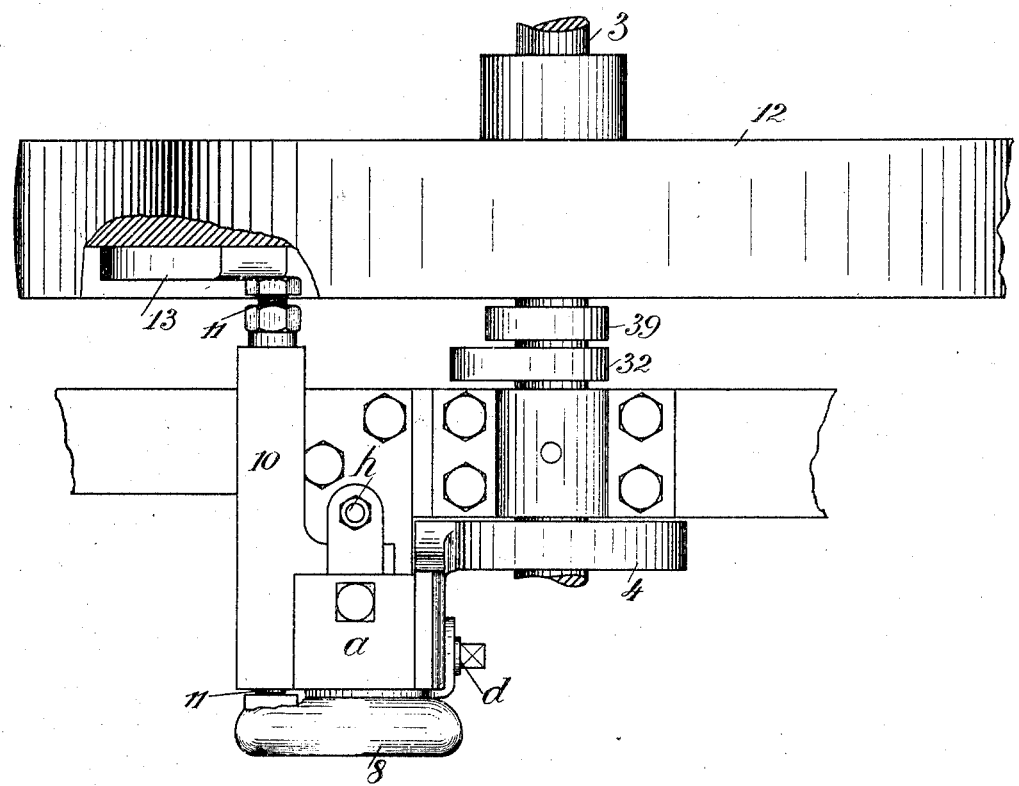
Witnesses
H. M. Kuhne
John A. Percival
Inventor
Emil Schleicher
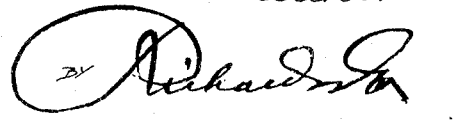
ATTORNEYS No. 789,389. PATENTED MAY 9, 1905.
E. SCHLEICHER.
MACHINE FOR THE MANUFACTURE OF HEADED PINS OR THE LIKE.
APPLICATION FILED OCT. 29, 1903.

6 SHEETS—SHEET 6.

Witnesses
H. M. Kuehne
John A. Percival

Inventor
Emil Schleicher
BY
Richardson
ATTORNEYS

No. 789,389.

Patented May 9, 1905.

UNITED STATES PATENT OFFICE.

EMIL SCHLEICHER, OF STOLBERG, GERMANY.

MACHINE FOR THE MANUFACTURE OF HEADED PINS OR THE LIKE.

SPECIFICATION forming part of Letters Patent No. 789,389, dated May 9, 1905.

Application filed October 29, 1903. Serial No. 179,110.

*To all whom it may concern:*

Be it known that I, EMIL SCHLEICHER, a subject of the Emperor of Germany, residing at Stolberg, Rhineland, in the Empire of Germany, have invented certain new and useful Improvements in Machines for the Manufacture of Headed Pins or the Like, of which the following is a specification.

As is well known, pins with raised round heads have been hitherto made entirely by hand, pieces of spiral or helical wire being placed on the blunt cut ends of the pin shafts or shanks and then compressed under a drop or trip hammer, so as to form spherical heads.

The present invention enables pins with raised round heads to be made by purely mechanical means, and more particularly by means of machines which in their main arrangement correspond to the usual machines serving for making needles with spread heads. In these machines a shaft-wire wound off a reel is passed through a straightening device and conveyed, by means of pincers or a gripper, intermittently to a knife and cut by the latter into needle lengths, the head being then stamped, cut, or spread by means of a tilt-hammer.

Now this invention is characterized by the shank-wire, which is moved forward in the ordinary manner, being introduced into an intermittently-moving wire spiral or helix, the piece necessary for forming the pin-head cut off from the latter and then compressed or formed in a spherical shape on the pin-shank by means of a tilt-hammer. The pin is then cut off and pointed in the ordinary manner.

This improved machine is shown in the accompanying drawings.

Figure 1:
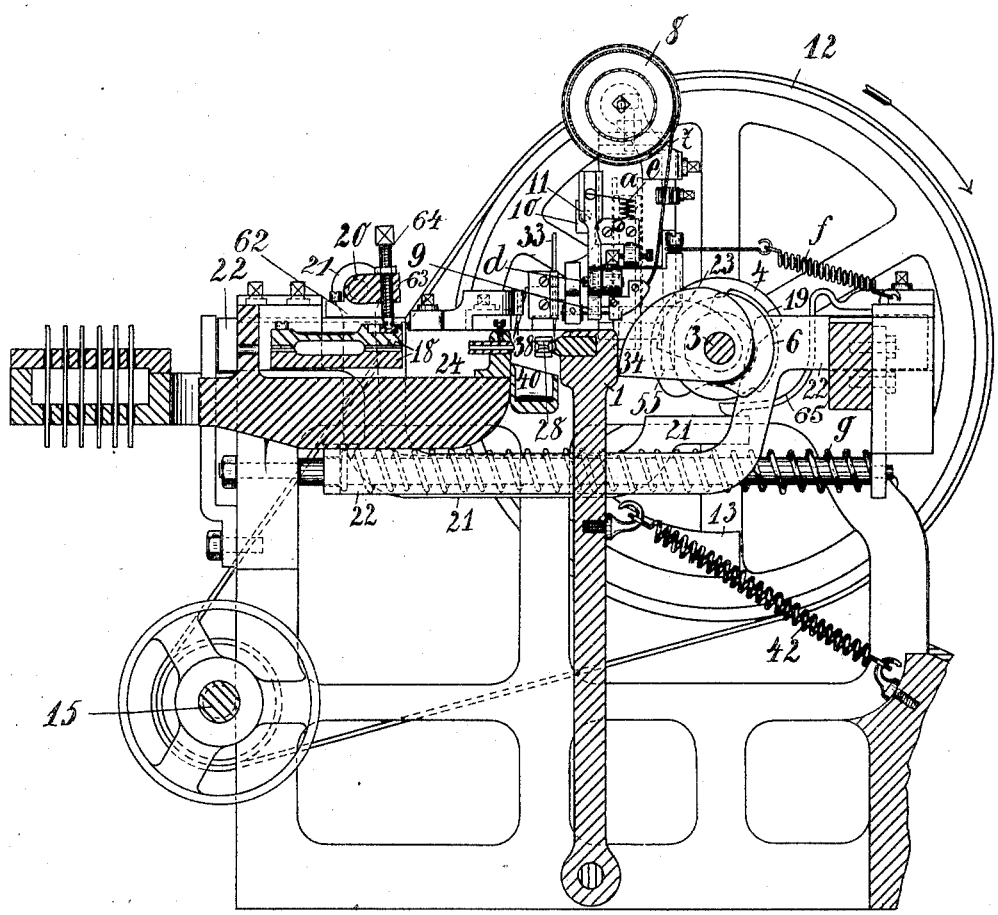
Figure 2:
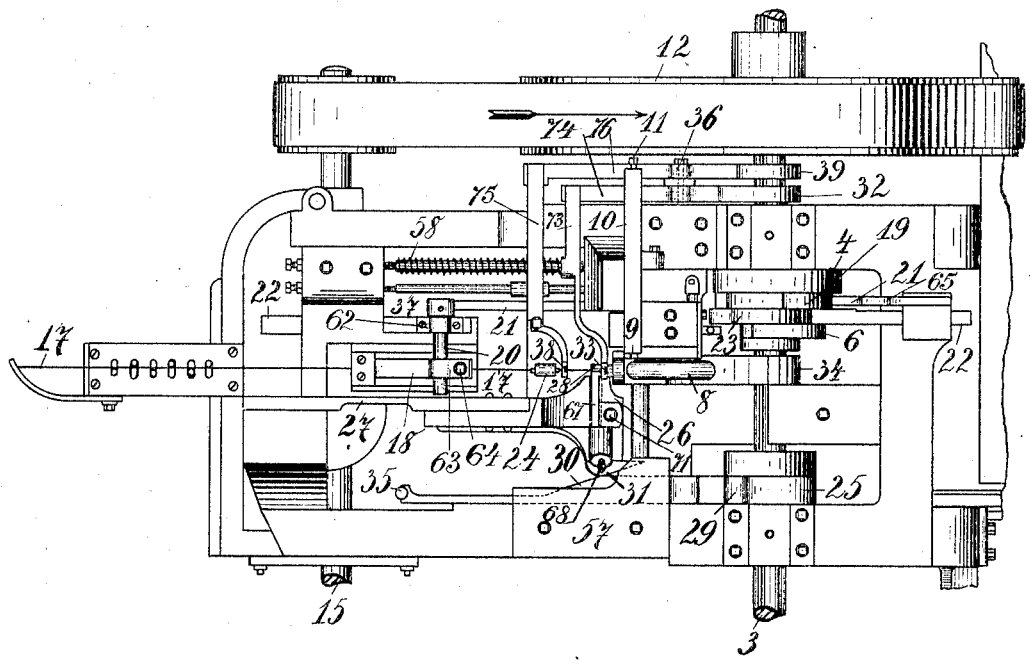

Figure 1 is a cross-section, Fig. 2 a plan view, Fig. 3 a front view, and Figs. 4 and 5 side views, of the carriage serving for feeding the wire screw, and Fig. 6 a section on the line $xx$ of Fig. 4. Figs. 7, 8, 9, and 10 illustrate details of the machine.

This improved machine is arranged substantially like the known machines for making needles with spread heads. A carriage $a$ for introducing the wire screw is arranged above a trip-hammer 1. This carriage is guided vertically in a dovetailed groove in a guide-piece 2, firmly connected with the machine-frame, Figs. 3 to 6. A horizontally-displaceable part $b$, also moving in swallow-tailed guides, is arranged in the part $a$, which part $b$ serves for moving forward the wire-helix 7. For this object the part $b$ is provided with pincers, one of the jaws, 9, of which is pivotally mounted on a pin $d$ and is under the influence of a spring $e$, Figs. 3 to 5, which keeps the pincers open. A pressure-bolt 11 is located in a guide-piece 10, rigidly connected with the carriage $a$, the said bolt 11 being subject to spring-pressure and at a given time pressed, by means of a segmental bar 13, Fig. 1, mounted on a belt-pulley 12 of the machine, inwardly against the pivotal jaw 9 of the pincers, compressing the spring, which acts on said bolt 11, and thus closing the said pincers.

The bolt 11 acts against the loose jaw by means of the bar 13 in the following manner: The segmental bar 13, which, as is evident from Fig. 1, is fixed laterally on the rim of the belt-pulley 12, is rounded off at its front end—that is, the end lying foremost in the direction of rotation of the pulley—as can be seen from Figs. 7 and 8. When the pulley rotates, the bar strikes with this rounded end against the head of the bolt 11 and, compressing the helical spring, Fig. 4, which is situated in an enlargement of the guide-piece 10 and which engages with the bolt, presses said bolt into the guide-piece so that the front end of the bolt comes against the upper arm of the loose jaw 9, Figs. 4 and 7, whereby the loose jaw turns against the pressure of its spring $e$, Fig. 3, and presses the wire helix 7 against the jaw fixed on the horizontally-displaceable part $b$, and consequently closes the pincers. The pincers remain closed until the segmental bar 13 moves off from the head of the bolt 11, whereupon both the pressure-bolt 11 and also the loose jaw 9 are automatically brought back into their initial position under the reacting force of their springs, so that the pincers are again opened and the wire helix 7 is released.

A cap 8, containing the wire helix 7, is arranged above on the carriage $a$, from which cap the wire helix is conveyed to the horizontally-displaceable part *b*, or rather the pincers 9 of the same. The part *b* of the carriage *a* is pushed forward at a suitable moment, with a simultaneous closing of the pincers 9, by means of a cam-disk 6, mounted on the shaft 3 of the machine and engaging at 55, Figs. 3 to 5, and returned by means of a spring *f*, Fig. 1, again to its initial position, simultaneously opening the pincers 9.

Figure 8:
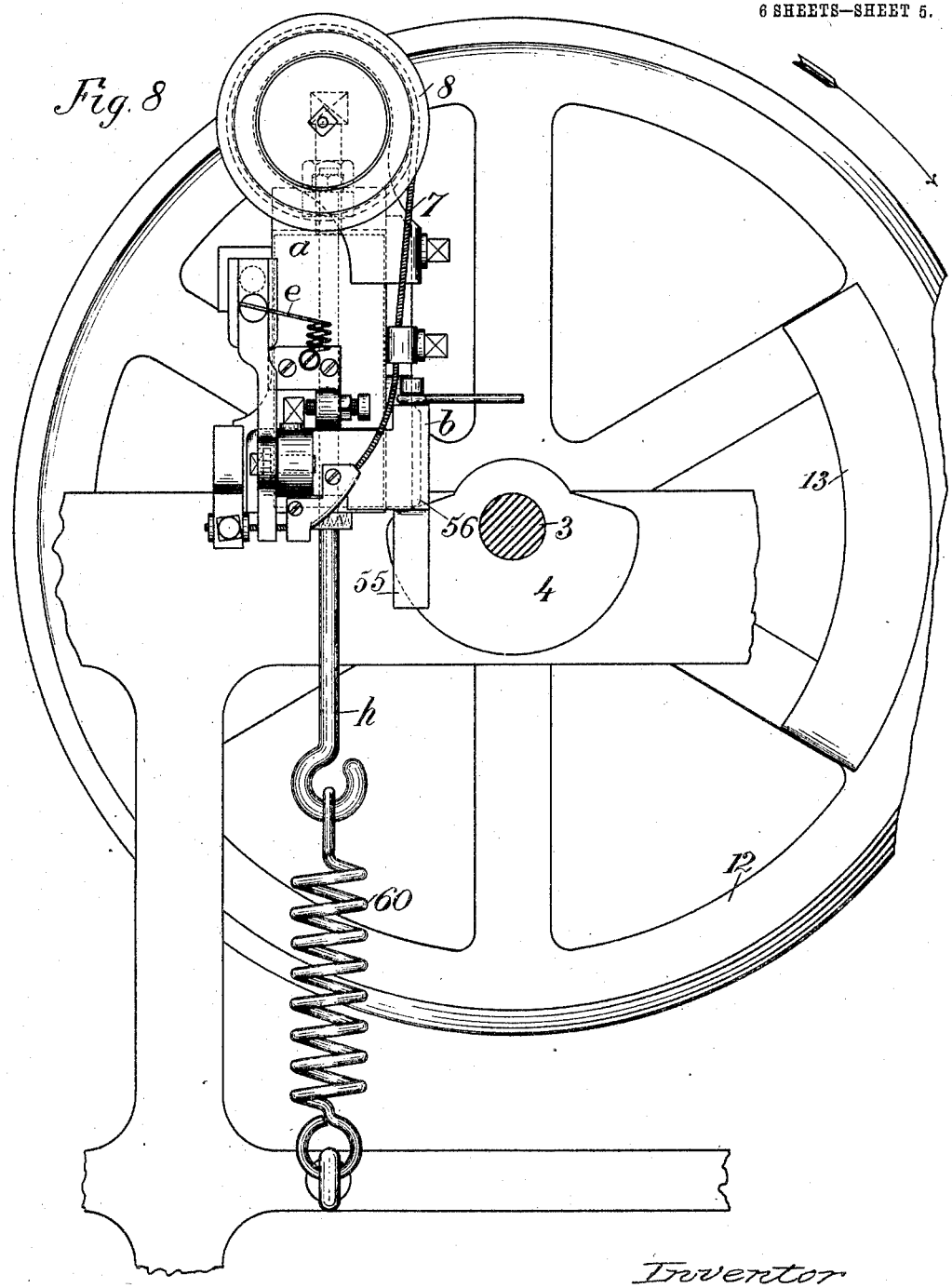

The carriage *a*, in conjunction with the part *b*, may be raised to a certain extent by the cam-disk 4, engaging at 56, Figs. 3 to 5, and on the cessation of the action of the cam-disk returned to its initial position by means of a spring 60, mounted on the lower end of the bar *h* and on the machine-frame, Figs. 4, 5, and 8. In addition to the knife 38 serving for cutting off the pin-shaft a second knife, 33, Fig. 1, is arranged, which is moved by a separate cam-disk 32, Fig. 2, and serves for cutting off the piece of wire helix used for forming the pin-head. The cam-shaft 3 of the machine is rotated in the ordinary manner by belt transmission from the driving-shaft 15.

The mode of working of the machine is as follows: A shank-wire 17, Fig. 2, is conveyed to the pincers 18 in the ordinary manner, passing through a straightening device. The pincers 18 are arranged on the yoke 22, Fig. 1, horizontally displaceable on the frame of the machine, and consist of an under fixed and an upper loose jaw, the latter of which is resilient at its back part and is screwed onto the under jaw. By means of its resilience the upper jaw is kept at a certain distance from the under one. As is shown in dotted lines in Fig. 1, the bearing 62 for the spindle 20, Fig. 2, is rigidly connected with the yoke 22. On the one end of the spindle 20 the arm 21, Fig. 2, is rigidly fixed, whereas on the other end of the same the short arm 63 is fixed. The pressure-screw 64, which acts on the front end of the upper resilient jaw of the pincers 18, is arranged on the arm 63. When the cam 19 acts, through the leaf-spring 65, Fig. 1, which is merely a wearing-piece adapted after being worn to a certain extent to be replaced by a new one, on the arm 21, rigidly connected with the spindle 20, the spindle 20 is turned, the pressure-screw 64 is pressed against the upper resilient jaw, and the shank-wire 17, lying in the pincers, is clamped fast. When now the yoke 22 is moved forward in a horizontal direction by the cam 23, its spring *g* being compressed, the arm 21, with its spindle 20, also moves correspondingly forward, and the wire 17 is taken along by the pincers 18. When the action of the cams 19 and 23 ceases, the upper jaw in consequence of its reacting resilience rises automatically from the under jaw and releases the shank-wire, and the pincers 18 are returned by means of the reacting force of the spring *g*, Fig. 1, together with the yoke 22, bearing 62, spindle 20, and arm 21, into the initial position. The shank-wire moved forward by the pincers 18 at intervals passes the guide-tube 24, Figs. 1 and 2, which is fixed on the machine-frame, and finally reaches the wire-holder 26.

Figure 9:
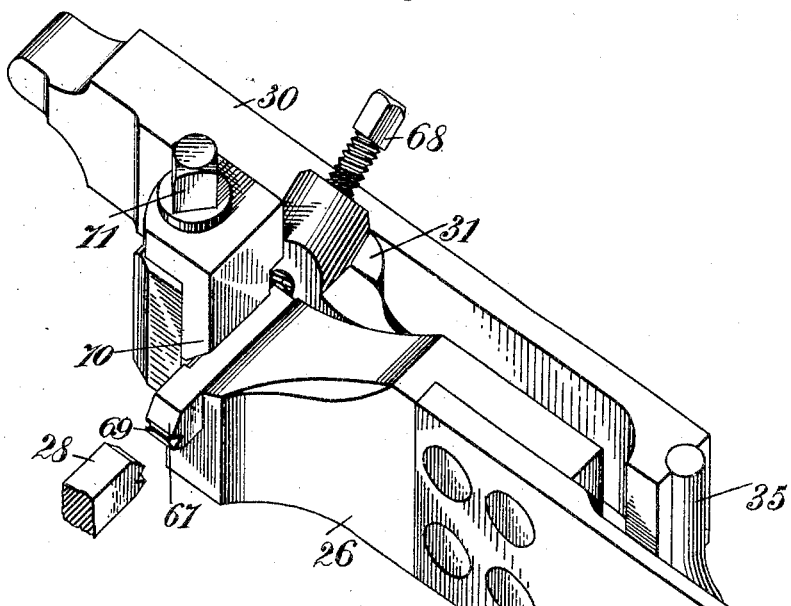

The wire-holder 26, Figs. 2 and 9, consists of a hammer-shaped head-piece which is fastened on the frame of the machine by means of the leaf-spring 27, Fig. 2.

Figure 10:
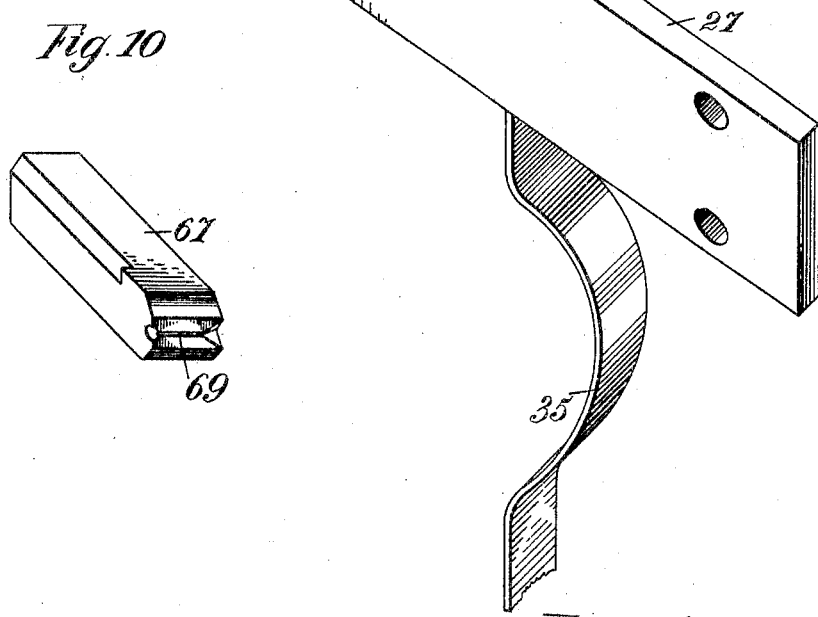

In the hammer-shaped head-piece of the wire-holder 26 a clamping-jaw 67 is displaceably arranged, which can be clamped fast by means of the clamping-piece 70 and the screw 71, Fig. 9, and can be set in position as desired by means of the set-screw 68. A second clamping-jaw 28, Figs. 1, 2, and 9, is rigidly arranged on the frame of the machine opposite the clamping-jaw 67. Each of the clamping-jaws, as can be observed from Figs. 9 and 10, is provided with an axial groove 69, both of which in the forward direction of the introduced shank-wire 17 are conically enlarged and at their back ends are rounded out in such a way that on the clamping-jaws being pressed against one another a hemispherical recess is formed at the back end. The grooves 69 in the clamping-jaws 28 and 67 are so deep that the shank-wire lying in them is pressed fast on the clamping-jaws being pressed against one another.

In the normal position of the wire-holder 26 the hammer-shaped head-piece of the wire-holder 26, with its clamping-jaw 67, is held, by means of the leaf-spring 27, at a certain distance from the clamping-jaw 28, fixed on the frame.

The carriage *a* when the shank-wire is pushed forward comes into a position in which the middle of the wire spiral or helix 7 lies exactly in the center line of the shank-wire fed in. In the drawings, Fig. 1, the carriage *a* is shown in a raised position. The wire helix has entered the semispherical aperture in the holder by means of the pushing forward of the part *b* of the carriage, which takes place by means of the cam-disk 6, the pincers 8 being simultaneously closed. The shank-wire fed in engages in the spiral, and then the wire-holder 26 is closed—that is to say, pressed against the fixed clamp-jaw 28, mounted in the machine-frame.

The closing of the wire-holder 26—that is, the pressing of the clamping-jaw 67 against the clamping-jaw 28, Figs. 2 and 9—is effected by means of the cam-disk 25, which acts on the pressure-block 30 through an intermediate exchangeable wearing-piece 29, Fig. 2. This pressure-block is guided below a plate 57, Fig. 2, in the machine-frame and is continually pressed against the cam-disk 25 by means of a leaf-spring 35, Figs. 2 and 9, fastened with its under end on the frame. The pressure-block 30 is provided with a beveled portion, the under end of which when the holder 26 is open lies against a wearing-piece 31, which is exchangeably fastened on the hammer-shaped head-piece of the wire-holder 26.

The cam-disk 25 presses the pressure-block 30 downward at the proper instant, whereby the latter, with its oblique portion, slides on the wearing-piece 31 and presses the holder 26 in opposition to the pressure of its leaf-spring 27 against the clamping-jaw 28, situated rigidly on the frame, whereby the clamping of the shank-wire lying between the clamping-jaws 28 and 67 is effected. After the shank-wire 17 is in this manner secured against shifting the knife 33 comes directly behind the wire-holder 26 onto the wire helix 7, introduced into the hemispherical hollow of the holder, and cuts off from this the piece serving for the formation of the needle-head. The knife 33 is on a lever 73, which is revolubly supported on the bolt 58, Fig. 2. Under the back end of the lever 73 the lever 74, supported at 36, engages the cam-disk 32, acting on this latter lever. The knife 33 is consequently depressed when the cam-disk 32 depresses the back end of the lever 74, whereby the back end of the lever 73 is raised and the knife 33 placed in the front end of the same is depressed. The knife 33 in consequence of the specially-adapted formation of the cam-disk 32, after the cutting off of the small piece of wire helix lying in the hemispherical hollow of the holder 26, is for the time-being still kept lowered, so that consequently a falling of the cut-off piece of wire helix is out of the question. This continues until the hammer 1 has moved, and by this time it is no longer possible for the piece of wire helix to fall. Before the hammer 1 moves forward the carriage $a$, together with the part $b$, is lifted by the cam-disk 4, so that then the way is clear for the hammer 1. The hammer 1, hitherto held in an oblique position by the spring 42, is then forced up by a cam-disk 34 and the helical piece is forced onto the shank as a round head. In the final position of the hammer 1 the lever 75 of the knife 38, pivotally mounted on a pin 37, is lowered by a cam-disk 39 by the intermediary of a lever 76, mounted at 36, and the pin-shank is cut off immediately in front of the guide-tube 24. The action of the cam-disk 25 then ceases, the beveled pressure device 30 is returned to its initial position by the action of the strip-spring 35, engaging its lower end and mounted on the frame of the machine, and the wire-holder is opened under the action of the spring 27, so that now the pin is released and falls into a receptacle 40. From the receptacle 40 the pin is conveyed to a point-grinding machine (not shown in the drawings) constructed in the usual manner.

The separate-acting parts of the machine are moved, by means of suitably-shaped cam-disks, in the manner exactly necessary for carrying out the work and after each operation returned by springs to their initial position.

This improved machine is of considerable advantage for manufacturing pins, as thereby a considerably-increased delivery is obtained over the ordinary method of making, and the head of the pin or needle is better brought into the spherical form than when made by hand, and thus the pins have a considerably better appearance.

Having now particularly described and ascertained the nature of my said invention and in what manner the same is to be performed, I declare that what I claim is—

1. In a machine for making pins with round raised heads, the combination of means for intermittently moving forward a wire helix for forming the heads, means for intermittently feeding forward the shank-wire and introducing the end of the same into the wire helix, means for cutting off a portion of the wire helix adapted to form the pin-head, and means for compressing said portion into the form of the head, substantially as described.

2. In a machine for making pins with round raised heads, the combination of means for intermittently feeding forward a wire helix for forming the heads, said means consisting of a vertically-displaceable carriage, a horizontally-displaceable part mounted on said carriage, means mounted on said displaceable part adapted to clamp the wire helix at the required times, means for actuating said clamping means, and means adapted when the carriage is in a lowered position to move the horizontally-displaceable part forward and therewith the wire helix to the necessary extent; with means for intermittently feeding forward the shank-wire and introducing the end of the same into the wire helix, means for cutting off a portion of the wire helix adapted to form the pin-head and means for compressing said portion into the form of the head, substantially as described.

3. In a machine for making pins with round raised heads, the combination of means for intermittently feeding forward a wire helix for forming the heads, said means consisting of a vertically-displaceable carriage $a$, a spring-pressed horizontally-displaceable part $b$ mounted on said carriage, pincers having a jaw fixed on said part $b$ and a jaw 9 pivoted on said part $b$, the spring-pressed pressure-bolt 11 adapted to engage with the jaw 9, the guide-piece 10, the belt-pulley 12, the bar 13 on said pulley for actuating the bolt 11, and means adapted when the carriage is in a lowered position to move the horizontally-displaceable part forward and therewith the wire helix to the necessary extent; with means for intermittently feeding forward the shank-wire and introducing the end of the same into the wire helix, means for cutting off a portion of the wire helix adapted to form the pin-head and means for compressing said portion into the form of the head, substantially as described.

4. In a machine for making pins with round raised heads, the combination of means for intermittently feeding forward a wire helix for forming the heads, said means consisting of a vertically-displaceable carriage $a$, a horizontally-displaceable part $b$ mounted on said carriage, pincers mounted on said part $b$ adapted to clamp the wire helix at the required times, means for actuating said pincers, and means adapted when the carriage is in a lowered position to move the horizontally-displaceable part forward and the wire helix to the necessary extent; with means for intermittently feeding forward the shank-wire and introducing the end of the same into the wire helix, a wire-holder for clamping the shank-wire in proximity to its end, means for actuating said wire-holder at the required times, means for cutting off a portion of the wire helix adapted to form the pin-head and a hammer adapted to coact with said wire-holder to compress said portion to form the head, substantially as described.

In witness whereof I have hereunto set my hand in presence of two witnesses.

EMIL SCHLEICHER.

Witnesses:
  WILHELM KÜPPERS,
  GUSTAV ELSNER.